(12) United States Patent
Kesil et al.

(10) Patent No.: US 7,140,655 B2
(45) Date of Patent: Nov. 28, 2006

(54) PRECISION SOFT-TOUCH GRIPPING MECHANISM FOR FLAT OBJECTS

(75) Inventors: Boris Kesil, San Jose, CA (US); David Margulis, Campbell, CA (US); Elik Gershenzon, Daly, CA (US)

(73) Assignee: Multimetrixs LLC, Santa Clara, CA (US)

( * ) Notice: Subject to any disclaimer, the term of this patent is extended or adjusted under 35 U.S.C. 154(b) by 478 days.

(21) Appl. No.: 09/944,605

(22) Filed: Sep. 4, 2001

(65) Prior Publication Data

US 2003/0130759 A1    Jul. 10, 2003

(51) Int. Cl.
*B66C 1/44*      (2006.01)
*B65G 49/07*     (2006.01)

(52) U.S. Cl. ................... 294/104; 414/941
(58) Field of Classification Search ........... 294/103.1, 294/86.4, 104; 414/941; 901/30, 33, 38, 901/39
See application file for complete search history.

(56) References Cited

U.S. PATENT DOCUMENTS

| | | | | |
|---|---|---|---|---|
| 4,715,637 A | * | 12/1987 | Hosoda et al. | 294/106 |
| 5,102,291 A | * | 4/1992 | Hine | 414/937 |
| 5,108,140 A | | 4/1992 | Bartholet | 294/106 |
| 5,504,345 A | | 4/1996 | Bartunek et al. | 414/936 |
| 5,810,935 A | * | 9/1998 | Lee et al. | 901/30 |
| 5,988,191 A | * | 11/1999 | Duncan | 211/41.18 |
| 6,155,773 A | * | 12/2000 | Ebbing et al. | 294/103.1 |
| 6,167,322 A | | 12/2000 | Holbrooks | 294/103.1 |
| 6,216,883 B1 | * | 4/2001 | Kobayashi et al. | 414/941 |
| 6,256,555 B1 | | 7/2001 | Bacchi et al. | 294/88 |
| 6,435,807 B1 | * | 8/2002 | Todorov et al. | 414/941 |
| 6,623,235 B1 | * | 9/2003 | Yokota et al. | 414/744.8 |
| 6,900,451 B1 | * | 5/2005 | Kesil et al. | 250/559.36 |

* cited by examiner

*Primary Examiner*—Eileen D. Lillis
*Assistant Examiner*—Paul T. Chin

(57) ABSTRACT

A precision soft-touch gripping mechanism has a mounting plate attached to a robot arm. The plate supports a stepper motor. The output shaft of the stepper motor is connected through a spring to an elongated finger that slides in a central longitudinal slot of the plate and supports a first wafer gripping post, while on the end opposite to the first wafer gripping post the mounting plate pivotally supports two L-shaped fingers with a second and third wafer gripping posts on their respective ends. The mounting plate in combination with the first sliding finger and two pivotal fingers forms the end effector of the robot arm which is thin enough for insertion into a wafer-holding slot of a wafer cassette. The end effector is equipped with a mapping sensor for detecting the presence or absence of the preceding wafer, wafer position sensors for determining positions of the wafer with respect to the end effector, and force sensors for controlling the wafer gripping force. Several embodiments relate to different arrangements of gripping rollers and mechanisms for control of the gripping force and speed of gripping required for gripping the wafer with a soft and reliable touch.

7 Claims, 12 Drawing Sheets

PRECISION SOFT-TOUCH GRIPPING MECHANISM FOR FLAT OBJECTS

FIELD OF THE INVENTION

The present invention relates to the field of material handling equipment, in particular to mechanisms used in semiconductor production, disk-drive manufacturing industries and the like for precision gripping, transportation and positioning delicate, thin and highly accurate flat objects such as semiconductor wafers, hard disks, etc.

BACKGROUND OF THE INVENTION

One of the major methods used at the present time in the semiconductor industry for grasping, holding, moving, and positioning of semiconductor wafers is the use of a mechanical hand of a robot equipped with a vacuum chuck.

From the beginnings of the semiconductor industry to the late 1980s, wafers were handled manually and later by rubber-band conveyors and cassette elevators. The first standards for wafer of 2", 4", 6" diameters and appropriate cassette dimensions allowed to develop simple wafer handling mechanisms and standardize their designs. The early forms of automated handling contributed to improved yields by reducing wafer breakage and particle contamination. A variety of equipment layouts were used, but the general conception remained the same. In other words, the automation systems of that time relied mostly on stepper-motor-driven conveyor belts and cassette elevators to eliminate manual handling.

A central track would shuttle wafers between elevator stations that serviced cassettes and "tee" stations that serviced the process stations. This to some extent helped to reduce breakage, but did not solve the contamination problem. Furthermore, most equipment had manual loading as the standard, with the conveyor and elevators added. These systems were reliable and cheap and served as a good prerogative to automation of wafer handling by the times when 200-mm wafers came into use.

Further progress of the industry accompanied by an increase in the diameter of wafer with 200-mm diameter as a standard for substrates led to drastic changes in principles wafer handling occurred. Driven by ever-decreasing linewidths, tighter cleanliness and throughput requirements, and improvements in robotic technology, the rubber-band conveyor/cassette elevator solution was surpassed by true robotic wafer handling.

The new robotics consisted of polar-coordinate robot arms moving wafers with so-called "vacuum end effectors. In robotic, the end effector is a device or tool connected to the end of a robot arm. For handling semiconductor wafers, an end effector may be made in the form of grippers of the types described, e.g., in U.S. Pat. Nos. 5,108,140, 6,116,848, and 6,256,555. More detailed description of these end effectors or grippers will be considered later.

These robots were an improvement over the earlier technology. Since the robot's movements were controlled by microprocessor-based servo controllers and servomotors, it became possible to greatly improve the throughput, reliability, and error handling of the wafer handling systems. For example, a typical rubber-band conveyor and cassette elevator system could handle only tens of wafers per hour, while a three-axis robot could move hundreds. Reliability of robots was increased at least up to 80,000 hours mean time between failures (MTBF) compared to a few thousand hours for the conveyor systems. In the case of emergency situation the operator must immediately locate a wafer. This was not always possible with a belt-drive conveyor that could not always determine a current position of the wafer, whereas a robot system, which was characterized by a few possible wafer locations, could significantly facilitate a solution of the problem and allowed automated error handling.

Introduction of microprocessor control allowed true unattended equipment operation. Operators could manually load cassettes, and the tool could automatically process full wafer lots. Standards also were improved and introduced into use (see, e.g., SEMI standards). However, these standards helped reduce, but did not eliminate, the confusion involved in the selection and application of robotic wafer handling. For example, there are SEMI standards for cassettes, yet many nonstandard cassettes are used. Another compromise is the need to design semiconductormanufacturing equipment suitable for accepting a large variety of wafer sizes. This adds unnecessary complexity to equipment design.

Furthermore, many equipment manufacturers built their own robots. Each model had to be adaptable to many different wafer sizes and a variety of cassettes.

Recent transfer to 300-mm wafers, evolved new problems associated with much higher cost of a single wafer (up to several thousand dollars as compared with several hundred dollars for 200 mm wafers) and thus required higher accuracy and reliability of the wafer handling equipment. These problems becomes even more aggravated for handling double-sided polished wafers, where both sides of the wafer are used for the production of the chip. In other words, only edges of the wafers could be used for gripping, moving, and positioning of the wafers.

Furthermore, transition to 300 mm wafers made the use of low vacuum unsuitableforholding and handling the wafers. The main reason that in order to protect the wafer from contamination through the mechanical contact with holding parts of the robot arm, both sides (front or back) of the wafer becomes untouchable for handling. Another reason is that vacuum holders are not reliable for handling wafers of heavy weight. Thus, the conventional vacuum end effectors appeared to be unsuitable for handling expensive, heavy, and hard-to-grip wafers of 300 mm diameter.

According to Semi Standards, the allowance for the gripping area of the 300 mm wafer should not exceed 3 mm from the edge of the wafer and preferably to be down to 1.5 mm or even less. To reliably hold the wafer and to protect it from breaking during all handling transportation procedures, it is necessary to use a limited holding force of at least at 3 points circumferentially spaced along the edge of the wafer.

Since the position of each cassette and each wafer within the cassette is unique, the location of each wafer within the three planes of the orthogonal coordinate system relative to the reference plane of robot arm should be measured and used for precise positioning of the robot arm that carries the gripper. Using mechanical measurements or preliminary mapping procedures of location of the wafer in a cassette for precise positioning of the gripper relatively to the grasping points is a time consuming procedure that is difficult to perform in real conditions of the variety of wafer stages at wafer handling robotic lines.

U.S. Pat. No. 5,570,920 issued on Nov. 5, 1996 to J. Crisman et al. describes a robot arm with a multi-fingered hand effector where the fingers are driven from a DC motor via a system of pulleys with control of a grasping force by means of strain gauges attached to the inner surfaces of the fingers. However, such a robot arm is three-dimensional and is not applicable for handling thin flat objects, such as semiconductor wafers, located in a deep narrow slots of a multistack cassette of the type used for storing the wafers.

U.S. Pat. No. 6,167,322 issued on Dec. 26, 2000 to O. Hollbrooks, which describes Intelligent wafer handling system, is typical of the state of the art in two aspects. Hollbrooks system removes wafer from the cassette using a gripper that can slip in between parallel stacked and spaced wafers that has one or more actuating rods and one or more rotating fingers which are rotated by 90 degrees. Translator solenoid acting through an arm applies lateral movement to the finger to grasp the wafer between the finger and the posts. Grasping action is accomplished by using the finger to pressure the wafer against the fixed rods. The level of the pressure is maintained through the control of the electrical current applied to the driving translator. Hollbrook claims that the system can locate the position of the wafer with high degree of accuracy by employing light beams and photo sensors. The intelligent wafer handling system consists of a wafer mapping sensor mounted on the wrist end of the hand. The optics of the sensor is comprised of optical transmitters such as lasers or IR diodes and optical receivers such as CCD's or photo transistors used to receive reflections from the edge of the wafer. To determine the position of the front edge of the wafer, Hollbrook recommended using laser distance measuring unit. A laser head located on a two-axis mount would sweep the column of wafers in the cassette. To avoid the misreading of the wafer position, the sensor should span the small focal point across the edge. Hoolbrook recommended to avoid bending or cracking a wafer by lifting the movable finger, controlled precisely by closely controlling current through the voice coil of actuator.

A disadvantage of the wafer handling system of Hollbrooks consists in that this apparatus does not provide control of gripping speed at different stages of the gripping cycle. Another disadvantage of the Hollbrooks system consists in that this system does not provide decrease in gripping pressure when the gripper approaches the edge of the wafer with acceleration.

U.S. Pat. No. 5,504,345 issued on Apr. 2, 1996 to H. Bartunek et al discloses a dual beam sensor and an edge detection system. Two light sources of solid state lasers are used to detect the edges of the wafers in a cassette. The solution proposed by Bartunek et al. to install the wafer mapping sensor on the wrist end hand or on one side of gripper does not solve the problem of detecting the wafer before gripping or during regular mapping process. The wafer placed on the robot arm in front of the sensor would cover the field of view of the sensor. It is impossible to see the wafer in the next slot of the cassette looking above the front side of the wafer if the position of the sensor is determined by the recommendation of Bartunek's patent. But even if the precise position of the front edge of the wafer is known, there is no guarantee that the position of the backside of the wafer is related to the same plane as the front edge. In the meantime any inclination and tilted position of the wafer in a cassette might lead to wafer breakage during the gripping process.

U.S. Pat. No. 6,256,555 issued to Paul Bacchi, Paul S. Filipski on Jul. 3, 2001 shows gripping end effectors for wafer of more then 6 inches in diameter that include proximal and distal rest pads having pad and backstop portions that support and grip the wafer within the annular exclusion zone. The end effector includes a fiber optic light transmitting sensor for the wafer periphery and bottom surface. A disadvantage of the device of U.S. Pat. No. 6,256,555 consists in that this device does not allow to divide the gripping process into several stages with different controllable speeds. In order to prevent jerks at the moment of contact of the gripper with the wafer edge, the last stage of movement of the gripping fingers should be carried out with a reduced speed. The decrease in speed, however, reduces productivity of the gripper's operation. This problem is solved neither by the device of U.S. Pat. No. 6,256, 555 nor by any of the previously described devices.

U.S. Pat. No. 5,108,140 issued on April 1992 to S. Bartholet discloses a palm plate and grippers having tactile or other sensors on their upper surfaces to detect the position of the wafer and provide feedback to the control mechanism. A parallel vice-like grip is generated, but there are no means of detecting the real orientation of the wafer relative to the gripper. To control the gripping force directly at the gripping points of the wafer, it is necessary to measure two dimensional coordinates of the plane of the wafer, the relative coordinates, the front and backside edges, and adjust the gripping points to performed measurements and gripping procedures in real time. More problems related to a limited load that robot arm is able to carry and the amount of wires that can deliver the control and sensing signals to a robot controller.

Thus none of the existing robot-arm end effectors is suitable for grasping and moving semiconductor wafers with high precision and grasping force controlled so as to provide soft touch without loss in productivity of the gripping device.

OBJECTS OF THE INVENTION

It is an object of the invention is to provide an end effector for handling flat thin objects, such as semiconductor wafers or glass substrates, with a predetermined or adjustable soft-touch gripping force. It is another object to provide an end effector that operates with high reliability. A further object is to provide end effectors with at least three edge gripping posts moving simultaneously in the same direction and stopped when a predetermined gripping force is achieved. Another object is to provide the end effector equipped with a precision gripping-force measurement mechanism. Still another object is to provide an end effector with means for adjusting the speed and acceleration of gripping movements at different stages of the gripping cycle. Another object is to provide the end effector in which accelerated approach of the gripper to the edge of the wafer could be compensated by controlled decrease in the gripping force.

SUMMARY OF THE INVENTION

A precision soft-touch gripping mechanism of the invention has a mounting plate attached to an external transportation means such as a robot arm. The plate supports a stepper motor. The output actuator member of the stepper motor is connected through a force control unit to a bar that slides in a central longitudinal slot of the plate. The distal end of the bar supports a first wafer gripping post, while on the end, opposite to the first gripping post, the mounting plate pivotally supports two substantially L-shaped fingers with a second and third gripping posts on their respective ends. The mounting plate forms, in combination with the bar and pivotal fingers, the end effector of the robot arm which is thin enough for insertion into a wafer-holding slot of a wafer cassette. The mechanism of the invention is equipped with three sets of sensors. The first set of sensors is known as a mapping sensor that detects the presence or absence of the preceding wafer and generates a gripping initiation command, if the end effector is free from the preceding wafer or another obstacle. The second set of sensors includes wafer position sensors for determining positions of the wafer with respect to the end effector and for controlling positioning of the wafer in the end effector. The third set of sensors contains sensors for measuring and controlling a wafer gripping force. The end effector of the invention provides an extremely accurate positioning of the wafer and a precisely controlled gripping force of the wafer with a soft touch. Several embodiments relate to different arrangements of gripping rollers and mechanisms for control of the gripping force speed and acceleration of gripping.

DETAILED DESCRIPTION OF THE INVENTION

Figure 1:
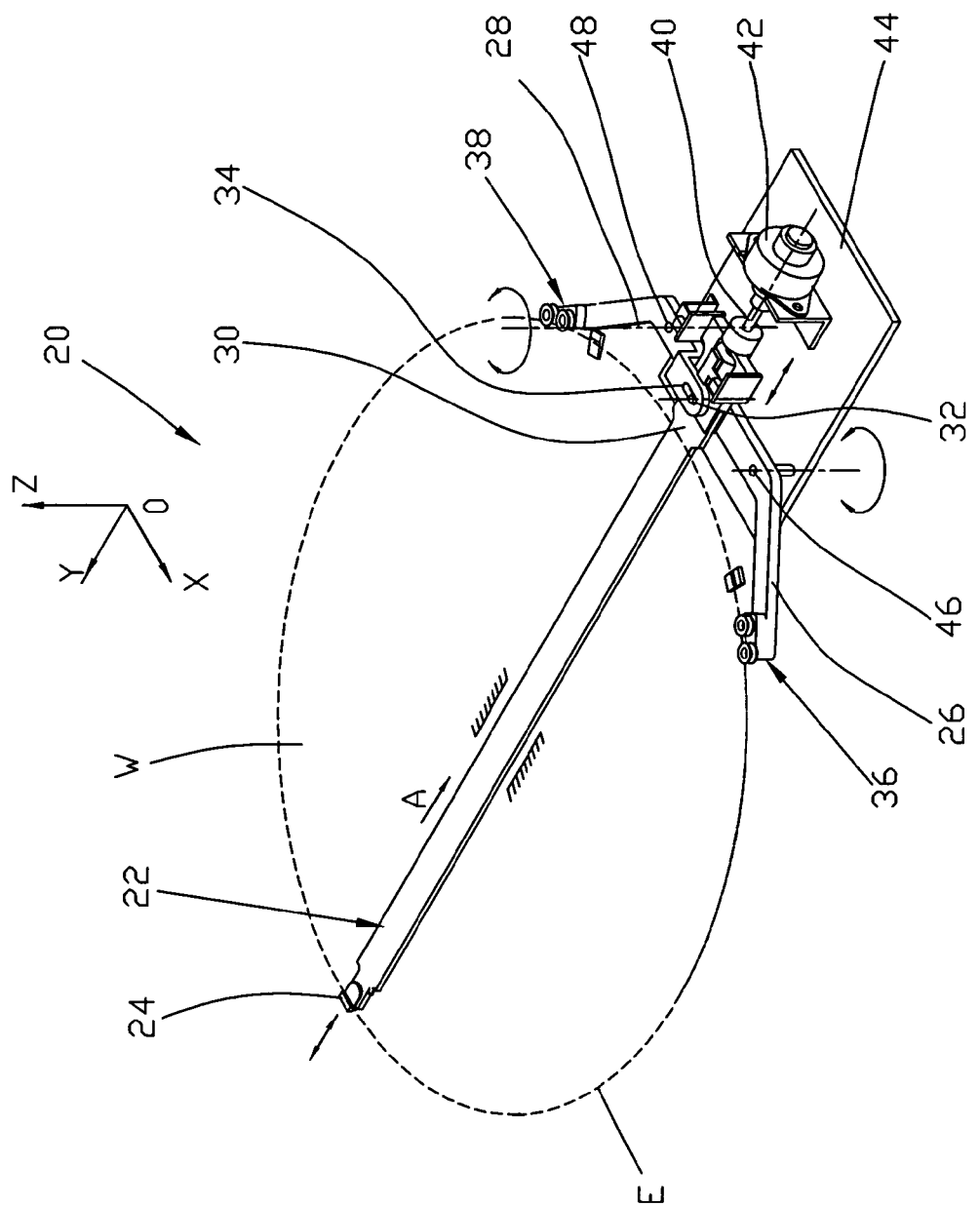
FIG. 1 is a three-dimensional view illustrating kinematics of the wafer gripping mechanism used in the apparatus of the invention.

A three-dimensional view illustrating kinematics of the gripping mechanism of the invention is shown in FIG. 1. The mechanism of the invention will be further described and illustrated in the form of the embodiment specifically for handling semiconductor wafers, although the mechanism is applicable also to other flat round objects. For simplification of the drawing and explanation, FIG. 1 shows only mechanical wafer-handling parts of the end effector of the invention, while images and description of optical and electrical parts are omitted. Furthermore, main elements of the wafer grasping mechanism are shown schematically. It can be seen from FIG. 1 that the grasping mechanism or end effector, which in general is designated by reference numeral 20, consists of three linking members or gripping fingers. A first linking member or finger 22 is made in the form of a longitudinal bar. The distal end of the first finger or bar 22 supports a first or distal post 24. A second linking member or finger 26 and a third linking member or fingers 28 are made in the form of substantially L-shaped arms. The end of each arm 26 and 28 is connected to a plate 30, which is made integrally with the proximal end of the bar 22 or is rigidly connected thereto. The proximal end of the bar 22 is the one opposite to the above-mentioned distal end that supports the post 24. FIG. 1 illustrates only one connection of the arms to the plate 30, i.e., the connection in the form of a pin 32, which slides in a short longitudinal slot 34 of the arm 28. A similar connection is provided for the arm 26 on the opposite side of the plate 30 which cannot be seen in FIG. 1.

Free ends of fingers or arms 26 and 28 support the second and third posts 36 and 38 for gripping the peripheral edges of the wafers. The plate 30 is connected to an actuating rod 40 of a linear precision drive mechanism 42, e.g., a stepper motor. The stepper motor 42 is attached to a stationary member, e.g., a base plate 44. The base plate also rigidly supports pins 46 and 48 conventionally shown by lines. These pins 46 and 48 serve as pivot points for the arms 26 and 28. As a result, when the actuator 40 of the stepper motor 42 moves the plate 30 in the direction of arrow A (FIG. 1), the provision of the pin 32 in the slot 34 (as well as the pin and slot on the opposite side of the plate) and stationary pins 46 and 48 will cause the arms 26 and 28 to turn around the pins 46 and 48 and to move toward each other and hence to move the posts 36 and 38 toward the edge E of the wafer W shown in FIG. 1 by a broken line. It is understood that the post 24 can also move towards (or away from) the posts 36 and 38 in the above-mentioned wafer grasping (or releasing) operation.

Thus it has been shown that the gripping mechanism of the apparatus of the invention contains at least three gripping posts moveable simultaneously radially inwardly/outwardly with respect to an imaginary or real circular flat object such as a semiconductor wafer having a circular peripheral edge. The gripping posts embrace the circular peripheral edge from opposite sides.

Figure 2:
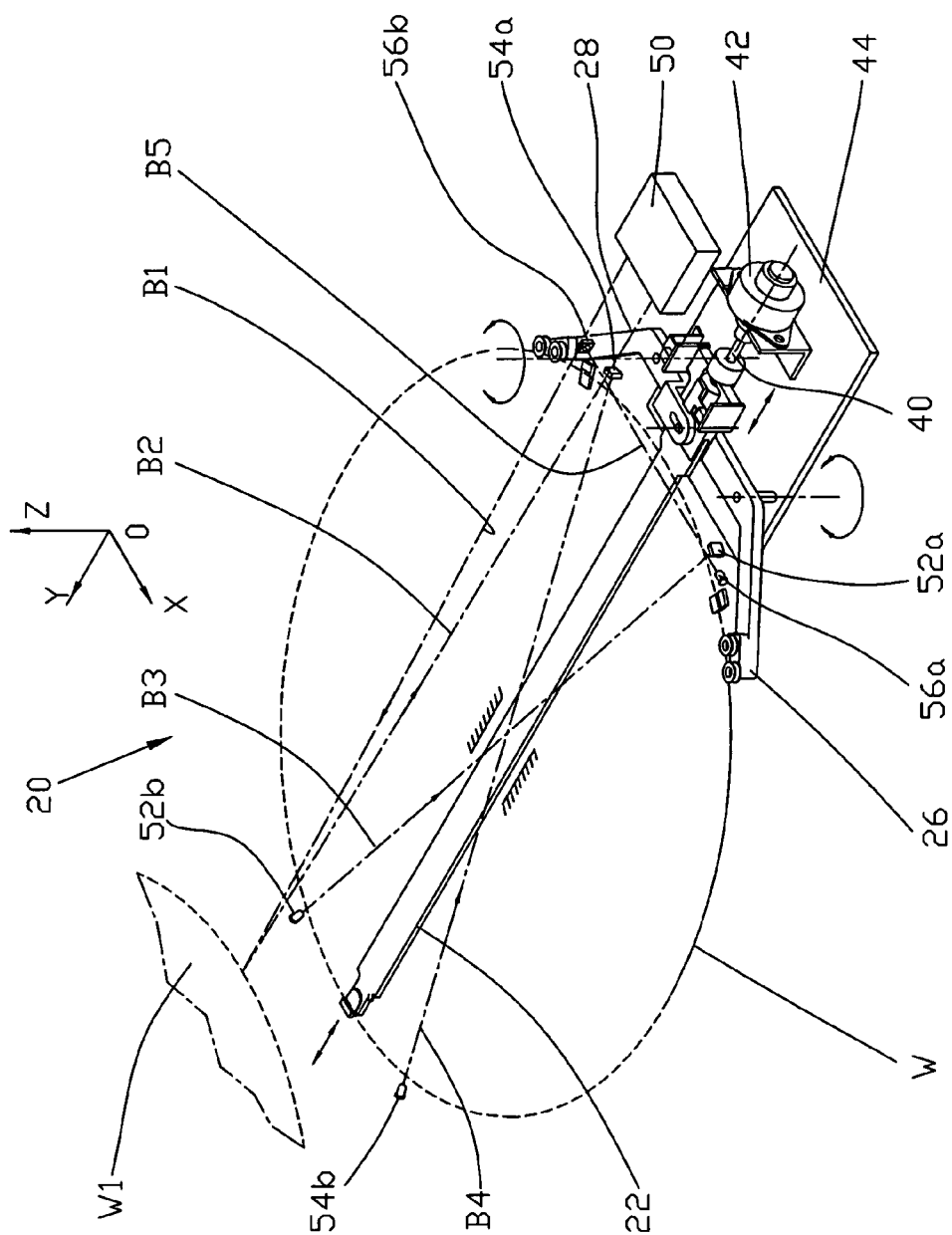
FIG. 2 is a view similar to FIG. 1 but with addition wafer position sensors and gripping force sensors.

FIG. 2 is a view similar to FIG. 1 but with an addition of wafer position sensors and gripping force sensors. More specifically, the mechanism is provided with at least one mapping sensor 50, at least two through-beam sensor 52a, 52b and 54a, 54b, and at least one front edge through-beam sensor 56a, 56b. These sensors are parts of an optical system used for detection of the position and orientation of the wafer W in a cassette during the wafer handling process.

The mapping sensor 50 can be made in the form of a light-modulated photoreceiver combined with a light emitting device such as a red-light laser diode with an optical collimator which forms a narrow beam B1 (FIG. 2) having a width of about 400 μm in the Z-axis direction. Normally, a wafer has a thickness on the order of 350–800 μm with a central peripheral cylindrical portion on the wafer edge having a width of about 200–400 μm. If a wafer W1 (where W1 designates position of the wafer W in the wafer cassette) is present in the cassette, the beam B1 will be reflected from the edge of the wafer W1 back to the photoreceiver (not shown) of the mapping sensor 50. The beam B2 (FIG. 2) reflected from the edge of the wafer W1 will be received by a Z-position photoreceiver o. The position of the wafer in a cassette could be determined by reading the data of a linear encoder of the robot arm at time when the mapping sensor detects the wafer W1.

If the wafer W1 is absent in the cassette, the reflected beam will not be received at all. Thus, the mapping sensor 50 will determine the presence or absence of the wafer in the cassette and, in the case when the wafer is present, will measure the Z-position of the wafer edge and compare it with the reference position required for the end effector 20 to slide between two stacked and spaced wafers.

Figure 3:
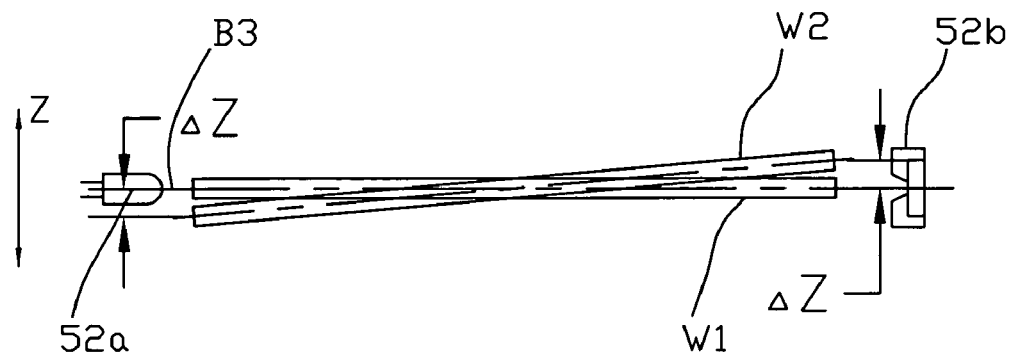
FIG. 3 is a side view illustrating position of a through-beam sensor for determining wafer plane inclination.

Two through-beam wafer plane inclination sensors 52a, 52b and 54a, 54b are intended for determining angular deviation of the plane of wafer W1 from a horizontal position. As shown in FIG. 3, which is a side view of one of the wafer plane inclination sensors (which are identical), e.g., of the 52a, 52b sensor, this sensor consists of an optical light transmitter 52a and light receiver 52b, e.g., a light-modulated photoreceiver with an appropriate electronics, etc. The light transmitter may be used in the form of a laser diode or LED with an optical beam collimator, which emits a narrow light beam B3 having a thickness of about 1 mm in diameter which is sufficiently small for penetration into the slot of a wafer cassette (not shown) which has a width of several millimeters and is able to detect the plane of inclination of the wafer. As can be seen from FIGS. 2 and 3, if the wafer W1 in the cassette is in accurate horizontal position within the allowed tolerances, the beam B3 will not propagate over the wafer. The same is true for beam B4 (FIG. 2) emitted from the light transmitter 54a towards the light receiver 54b. If the wafer is inclined from a correct horizontal position W1 shown in FIG. 2 and 3 to the position W2 shown in FIG. 3, the beam B3 will not be overlapped by the wafer W2. It is understood that the optical system should contain at least two through-beam wafer plane inclination sensors. This is because one such sensor cannot register inclination of the wafer about an axis that coincides with the direction of the through beam of this sensor. The sensors 52a, 52b and 54a, 54b should be arranged so that the through beams of both sensors would intersect above the center of the wafer W.

Figure 4:
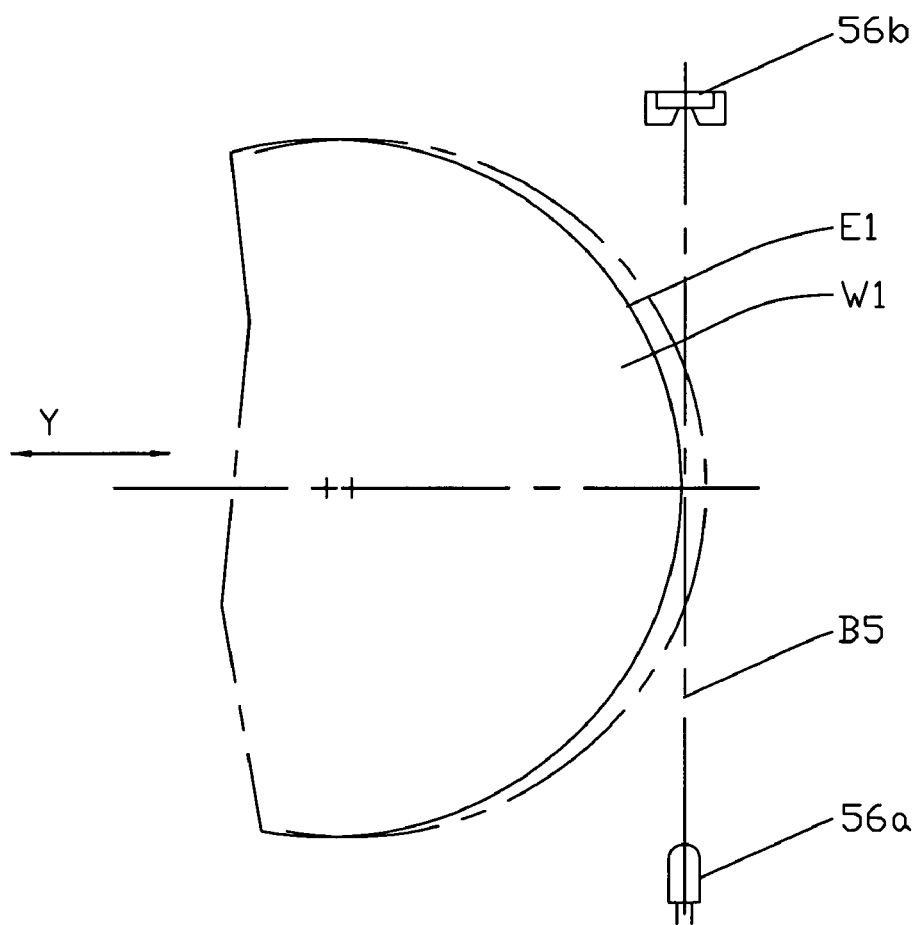
FIG. 4 is a plan view illustrating position of a wafer front edge detection sensor with respect to the wafer.

FIG. 4 is a schematic plan view illustrating a position of the front edge through-beam sensor 56a, 56b with respect to the front edge of the wafer W, i.e., the edge on the side of the stepper motor 42. This sensor may be the same as through-beam sensors 52a, 52b and 54a, 54b. The light beam B5 emitted from the light emitter 56a to light receiver 56b of the front edge through-beam sensor is perpendicular to the direction of Y axis (FIG. 2). At the moment when the front edge E1 of the wafer W1 in the cassette overlaps through beam B5, the sensor immediately sends a stopping command to the stepper motor 42, whereby the external transportation means such as a mechanical arm of the robot (not shown) stops, so that movement in Y-direction of the end effector 20 with respect to the wafer W1 in the cassette is also discontinued. Now the end effector is in a position ready for gripping the wafer W1. In this position of the end effector 20, the wafer is embraced by the posts 24, 36 and 38 which are in close proximity to the wafer edges but are not in contact therewith (FIG. 1).

Figure 5:
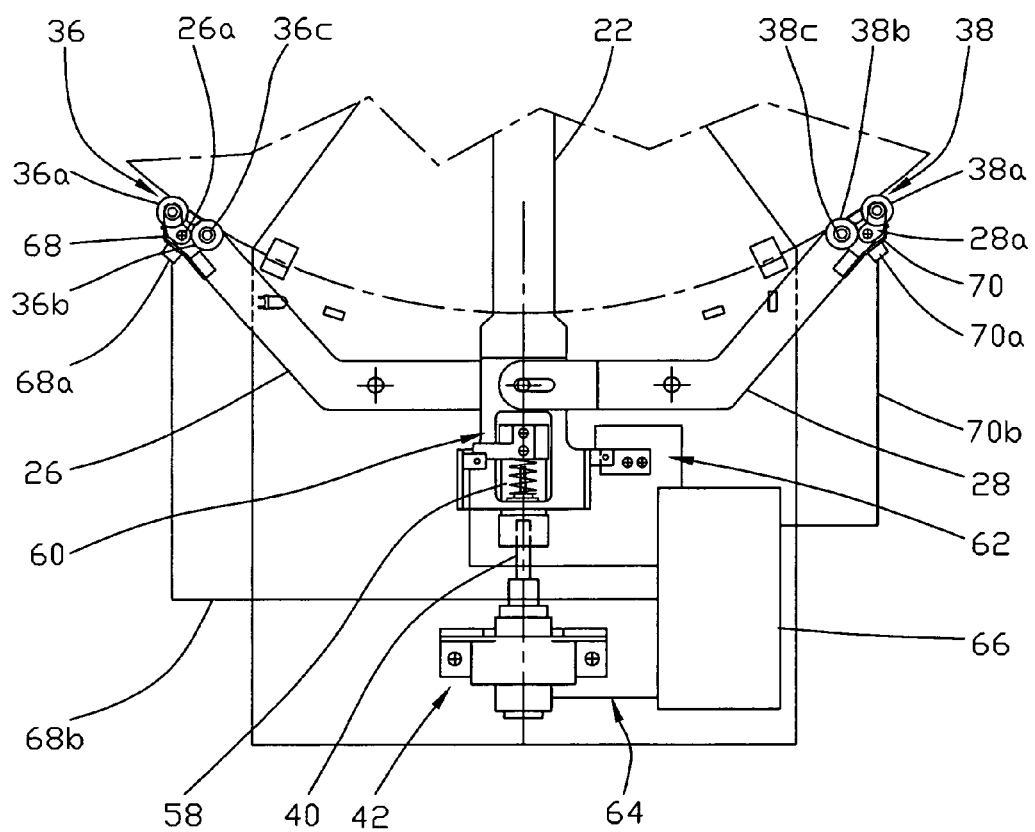
FIG. 5 is a fragmental plan view of the apparatus of the invention illustrating positions of gripping force sensors.

FIG. 5 is a fragmental plan view of the apparatus of the invention illustrating positions of gripping force sensors which constitute a part of a gripping force control system. In this drawing, reference numeral 22 designates the first finger which is located on the side of the wafer W opposite to the stepper motor 42. The proximal end of the first finger is connected to the actuating rod 40 of the stepper motor 42 via a main spring, e.g., a coil spring 58 with a strain gauge 60 which is precalibrated in terms of a force applied from the distal post 24 to the edge of the wafer when the first finger 22 comes into contact with the edge of the wafer W during the gripping operation. The terminal block 62 of the strain gauge is connected to the stepper motor 42 via a feedback line 64 with a microcontroller 66. The microcontroller may comprise a conventional microprocessor of 16F873 type produced by Microchip or Texas Instruments, TX, USA.

Figure 7:
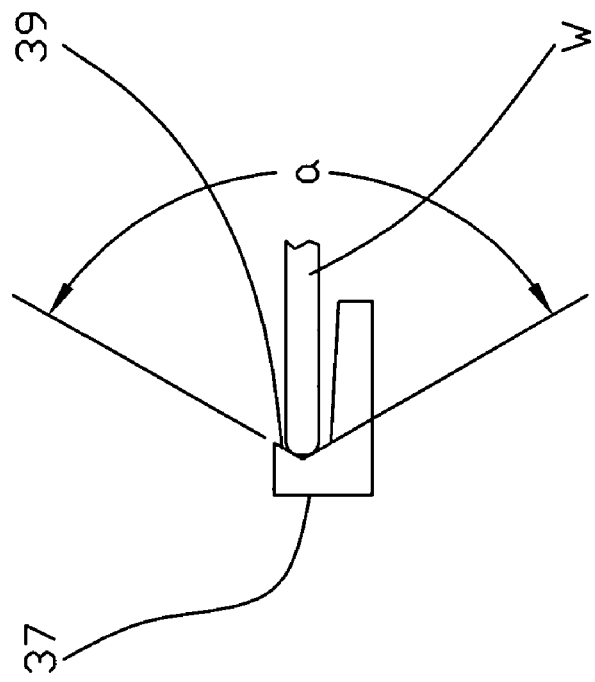
FIG. 7 is a side sectional view illustrating the profile of a distal post.
Figure 6:
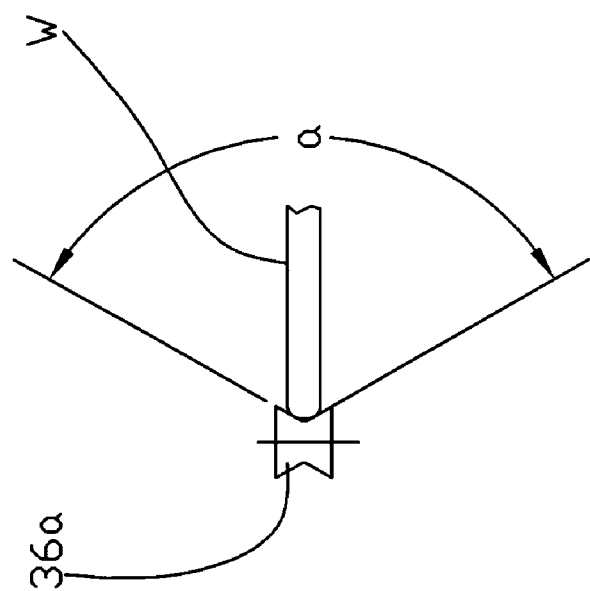
FIG. 6 is a side view of a spool-like gripping roller.

As shown in FIG. 5, each of the posts 36 and 38 comprises a pair of spool-like rollers of the type shown in FIG. 6. The rollers are supported rotatingly. Rotation of the rollers allows rolling contact between the edge of the wafer and the gripping elements during their contact. Thus, sliding friction is eliminated. The use of two rollers on each post is advantageous for eliminating problems associated with the provision of an indexing notch (not shown) on the periphery of semiconductor wafers. In the case one of the rollers is aligned with the position of such a notch, the second roller will still be in contact with the circular periphery of the wafer and thus will prevent misalignment of the gripper with respect to the wafer. Thus, the post 36 consists of rollers 36a, 36b, and the post 38 consists of rollers 38a, 38b. The roller of each pair may be identical. Let us assume that FIG. 6 illustrates the roller 36a. Regarding the post 24 (FIG. 1) on the distal end of the first finger 22, this post may have the same configuration as the one shown in FIG. 6. It is preferable, however, to make this post in the form of a vertical projection 37 with a V-shaped notch 39 shown in FIG. 7. Although in FIG. 7 the angle α of the groove 39 is shown as an angle of 120°, it can be an angle of 90°, or the like.

The use of two rollers on side fingers 26 and 28 decreases contact pressure on the edge of the wafer W and prevents the wafer W from breaking, deformations, and distortions. It can be seen that the spool-like roller 36a (and hence the remaining three rollers 36b, 37a, and 38b) has a concave elliptical profile for reliable and smooth gripping of the wafer edge. The inner rollers 36b and 38b are rotated on pins 36c and 38c, which are rigidly fixed to the ends of the fingers 26 and 28, respectively. The outer rollers 36a and 38a are rotated on short arms 26a and 28a which are connected to the ends of the fingers 26 and 28, respectively, and rotated about centers of the rollers 36b and 38b. The shorts arms 26a and 26b are spring-loaded by respective leaf springs 68 and 70 with strain gauges 68a, 70a which are calibrated in terms of the wafer gripping forces. The strain gauges 68a and 70a are connected to the microcontroller 66 via lines 68b and 70b.

During gripping operation, when all three fingers with their respective posts move radially inwardly for gripping the wafer W, the spring-loaded outer rollers 36a, 38a come into contact with the edges of the wafer W first. The continuing inward radial movement of the fingers 22, 26, 28 will cause deflection of the short arms 26a and 26b with deformation of the respective leaf springs 68 and 70. Deformation of these springs will be registered by the microcontroller 66 in terms of the wafer gripping forces. The gripping force on each arm is precalibrated so that the force reaches a required value when the edge of the wafer W comes into contact with the second pair of rollers, i.e., the rollers 36c and 38c. At this moment the microcontroller 66 sends a signal to stop the stepper motor. The strain gages 60, 68a, and 70a are calibrated to approximately the same gripping force. If, however, the forces measured by all three sensors have some deviations from each other, the force control system will stop the motor 42 when the first minimal value of the measured forces is achieved. Such an arrangement increases reliability of the gripping operation.

Figure 8:
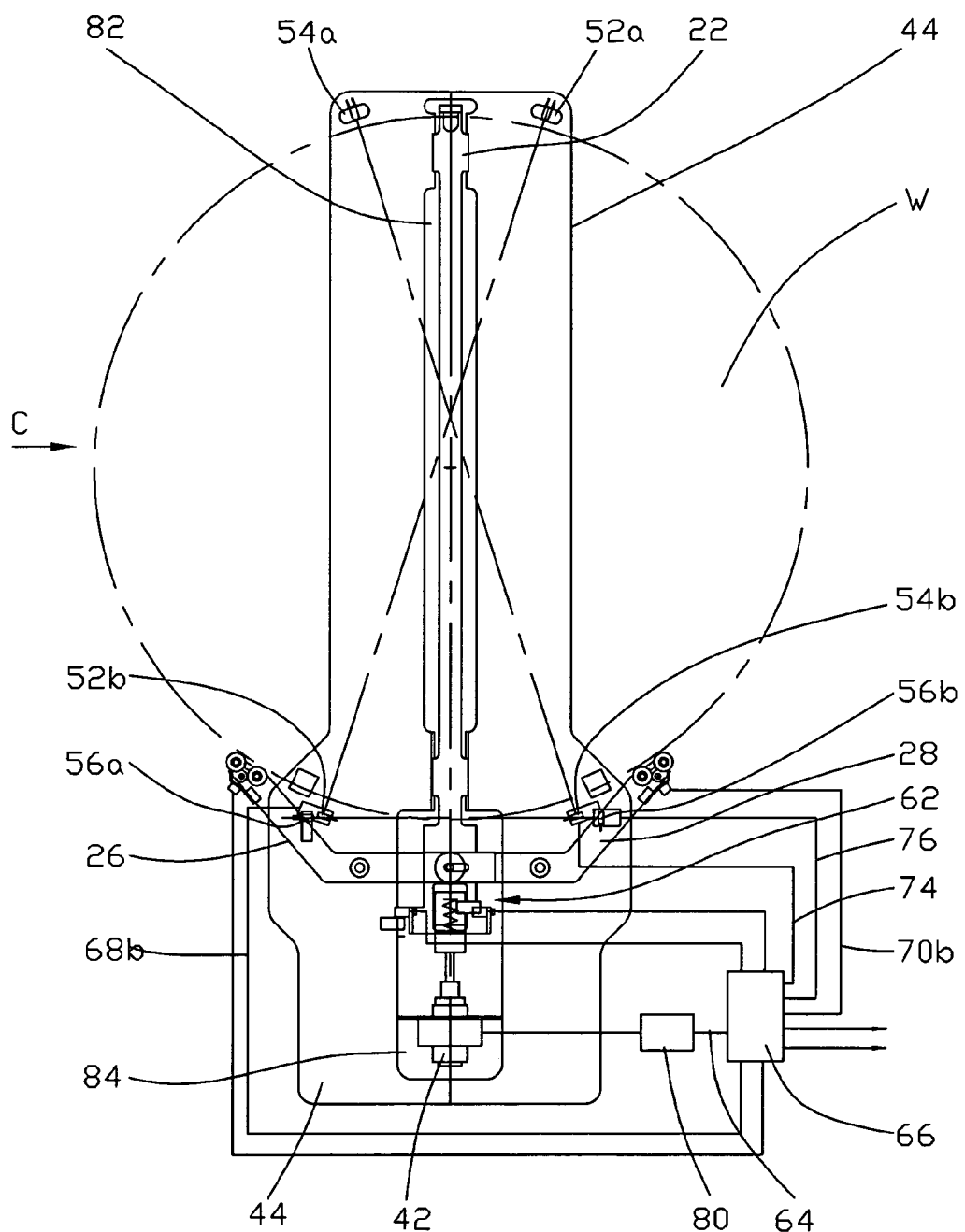
FIG. 8 is a schematic plan view of the apparatus of the invention illustrating arrangement of all main parts of the end effector of the invention.

FIG. 8 is a schematic plan view of the apparatus of the invention illustrating arrangement of all above-described position sensors 50 (FIG. 2), 52a, 52b, 54a, 54b, 56a, 56b (FIG. 4) and force sensors 60, 68a, 70a (FIG. 5) in combination with the microcontroller 66 for force sensors. The optical position sensors are connected via line 72, 74, 76, and 78 to the drive mechanisms of the mechanical hand of the robot (not shown) via the same microprocessor 66 as the force sensors.

It can be seen from FIG. 8 that the base plate 44 has a longitudinal slot 82 for guiding the first finger 22. The guide slot 82 coincides with the longitudinal axis Y—Y.

Figure 9:
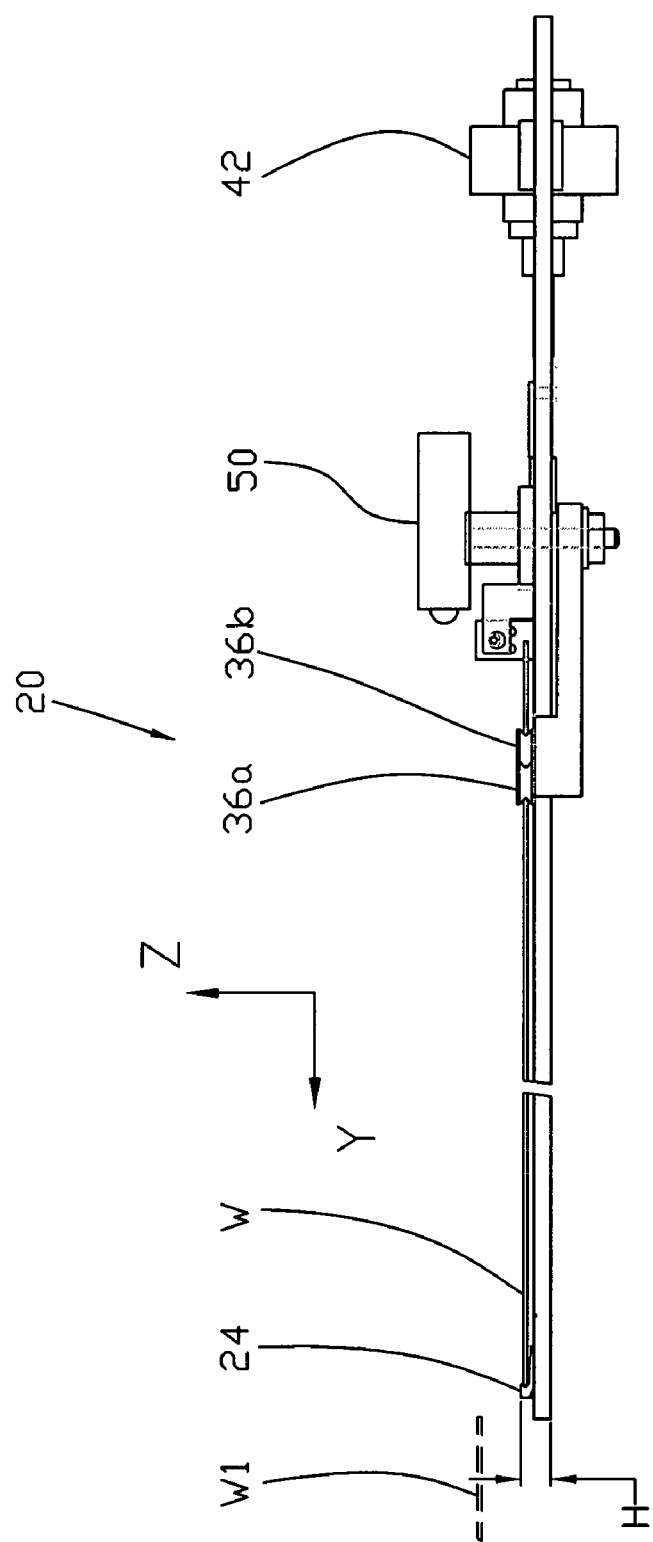
FIG. 9 is a side view of the end effector in the direction of arrow C.

In the actual structure, the base plate 44 may have a cutout 84 (FIG. 8) to accommodate the stepper motor 42. FIG. 9 is a side view in the direction of arrow C in FIG. 8. This view illustrates the position of the motor 42 in the slot and the position of the mapping sensor 50 with respect to the semiconductor wafer W1 in the cassette. Reference numeral W designates the same wafer after it has been gripped by the end effector 20 of the invention and lowered to the operation position shown in FIG. 9.

Figure 10:
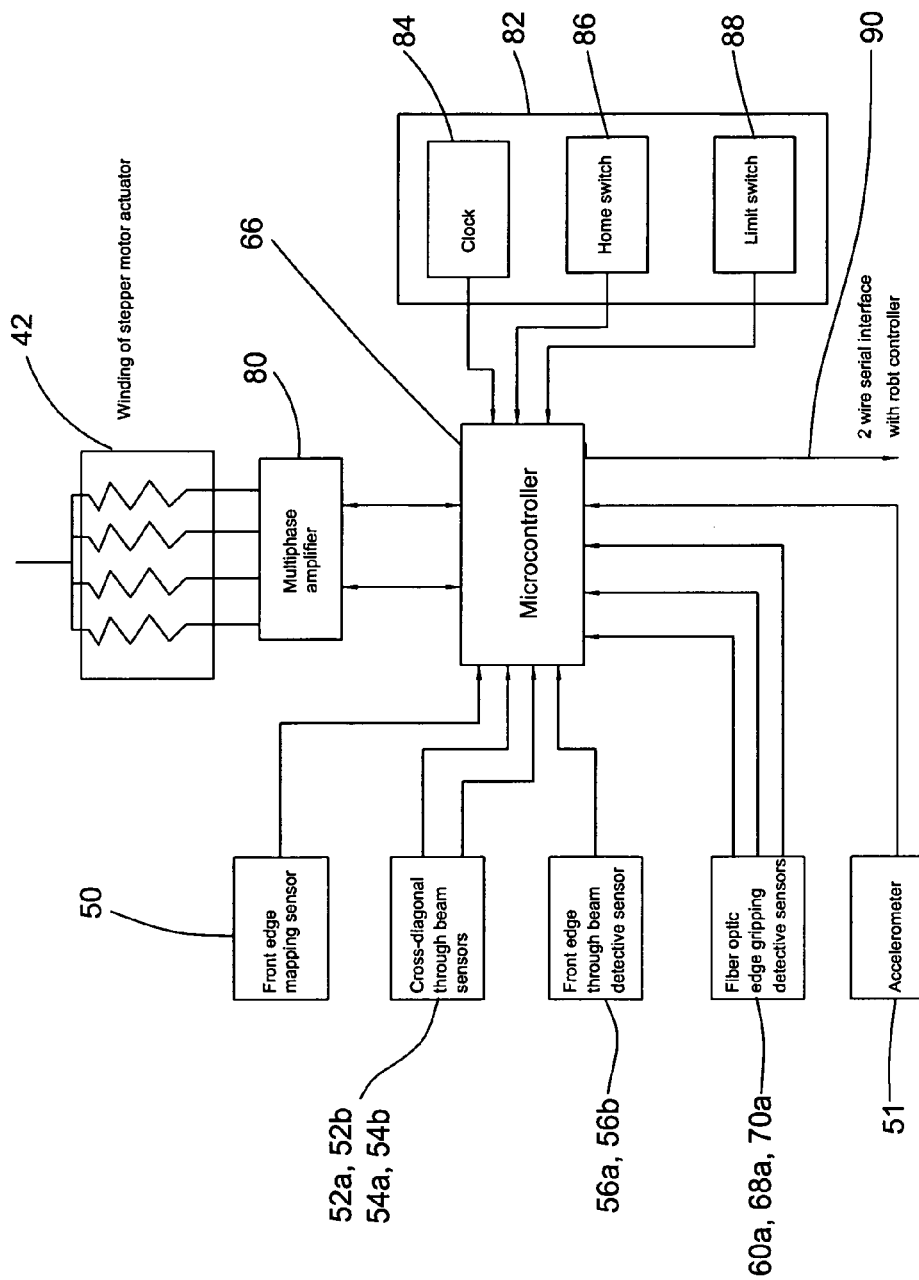
FIG. 10 is a block diagram of a control system for controlling operation of the end effector of the invention.

FIG. 10 is a block diagram of a control system for controlling operation of the end effector 20. The heart of the system is the microprocessor 66, which is connected to all peripheral actuating and control units. More specifically, the stepper motor 42 is connected to the microprocessor 66 via a multiphase amplifier 80. The microprocessor 66 is also connected to the mapping sensor 50, the through-beam wafer surface inclination sensors 52a, 52b, 54a, 54b, the front-edge through-beam sensor 56a, 56b, an accelerometer 51, and the griping force sensors 60, 68a, 70a. The microprocessor is also connected to a block 82 that contains a clock circuit 84, a home switch 86, and limit switches 88. Reference numeral 90 designates a serial interface for connecting the microcontroller 66 to the robot controller (not shown).

Figure 11:
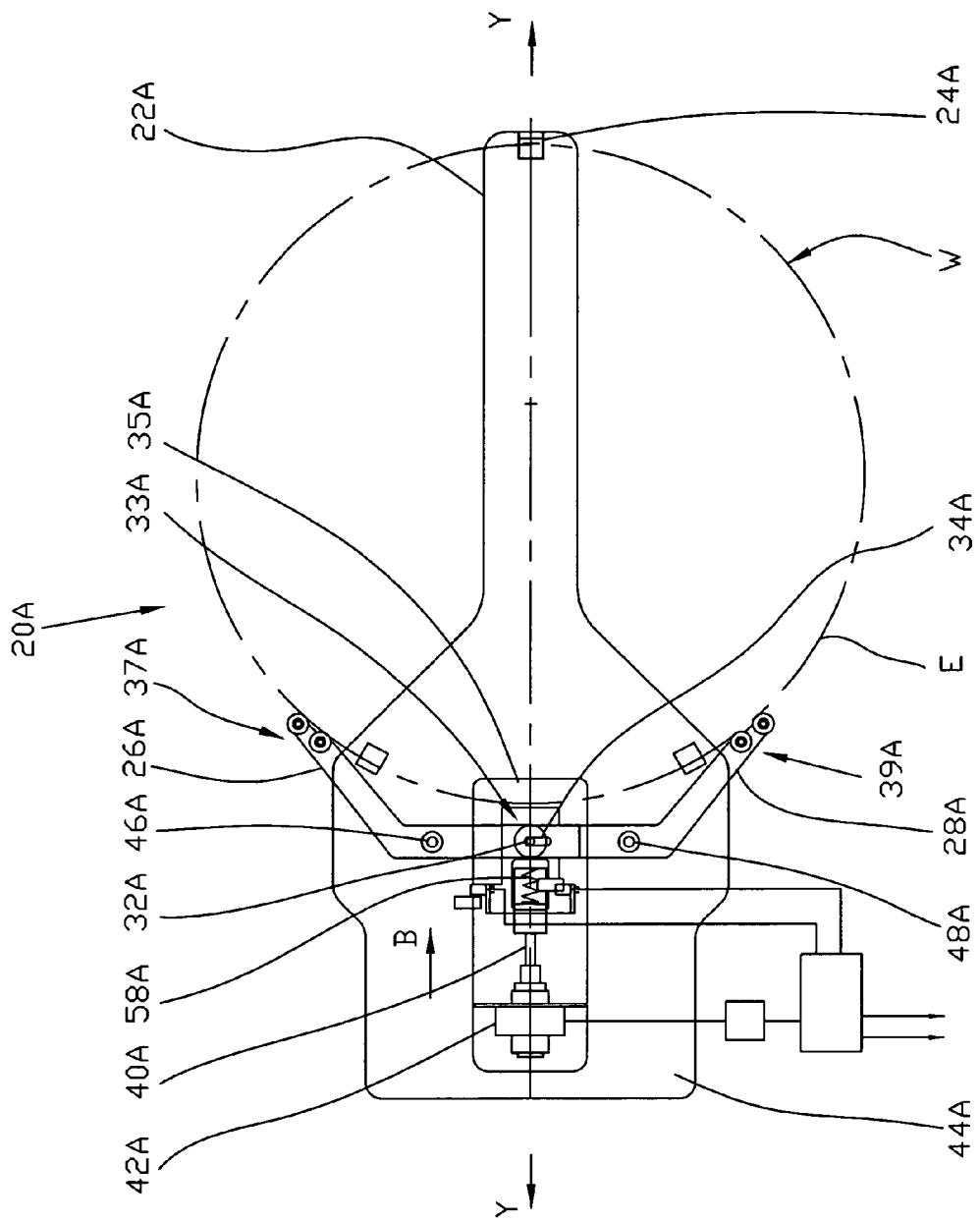
FIG. 11 is a view similar to FIG. 1 which illustrates an embodiment of the end effector with a simplified arrangement of gripping elements.

FIG. 11 is a view similar to FIG. 1, which illustrates an embodiment of an end effector 20A with a simplified arrangement of gripping elements. In the description and drawing of this embodiment, where possible, the parts identical with those of the previous embodiment will be designated by the same reference numerals with an addition of symbol "A".

It can be seen from FIG. 11 that the gripping mechanism or end effector, which in general is designated by reference numeral 20A, consists of three gripping fingers. A first finger 22A is made in the form of a longitudinal bar. The distal end of the first finger or bar 22A supports a first or distal post 24A. A second finger 26A and a third fingers 28A are made in the form of substantially L-shaped arms. Each arm 26A and 28A is pivotally attached to a base plate 44A via pivots 46A and 48A. One ends of the arms 26A and 28A are pivotally connected via a common pivot 32A to a slide 33A. The pivot 32A can slide in a longitudinal slots 34A and 34B formed on the respective ends of the arm 26A and 28A. Only one such slot 34a is shown in FIG. 11. The slide 33A is guided in a longitudinal slot 35A formed in the base plate 44A and having a direction that coincides with the longitudinal axis Y—Y of the stepper motor 42A.

Free ends of fingers or arms 26A and 2A supports the second and third posts 37A and 39A for gripping the edges of the wafers. The slide 33A is connected to an actuating rod 40A of the stepper motor 42A via a main spring 58A. The base plate 44A also rigidly supports pins 46A and 48A. These pins 46A and 48A serve as pivot points for the arms 26A and 28A. As a result, when the actuator 40A of the stepper motor 42A moves the slide 33A in the direction opposite to arrow B (FIG. 11), the provision of the slot 35A and connection of the arms 26A and 28A to the pivot 32A on the side 33A will cause the arms 26A and 28A to turn around the pins 46A and 48A and to move toward each other and hence to move the posts 36A and 38A toward the edges E of the wafer W shown in FIG. 11 by a broken line. In contrast to the embodiment of FIG. 1, in the embodiment of FIG. 11 the distal post 24A remains stationary.

The remaining parts of the end effector of the embodiment of FIG. 11, i.e., the position and force sensors, tension gages, and control elements are the same as in the embodiments of FIG. 1. Therefore their description is omitted.

Figure 12:
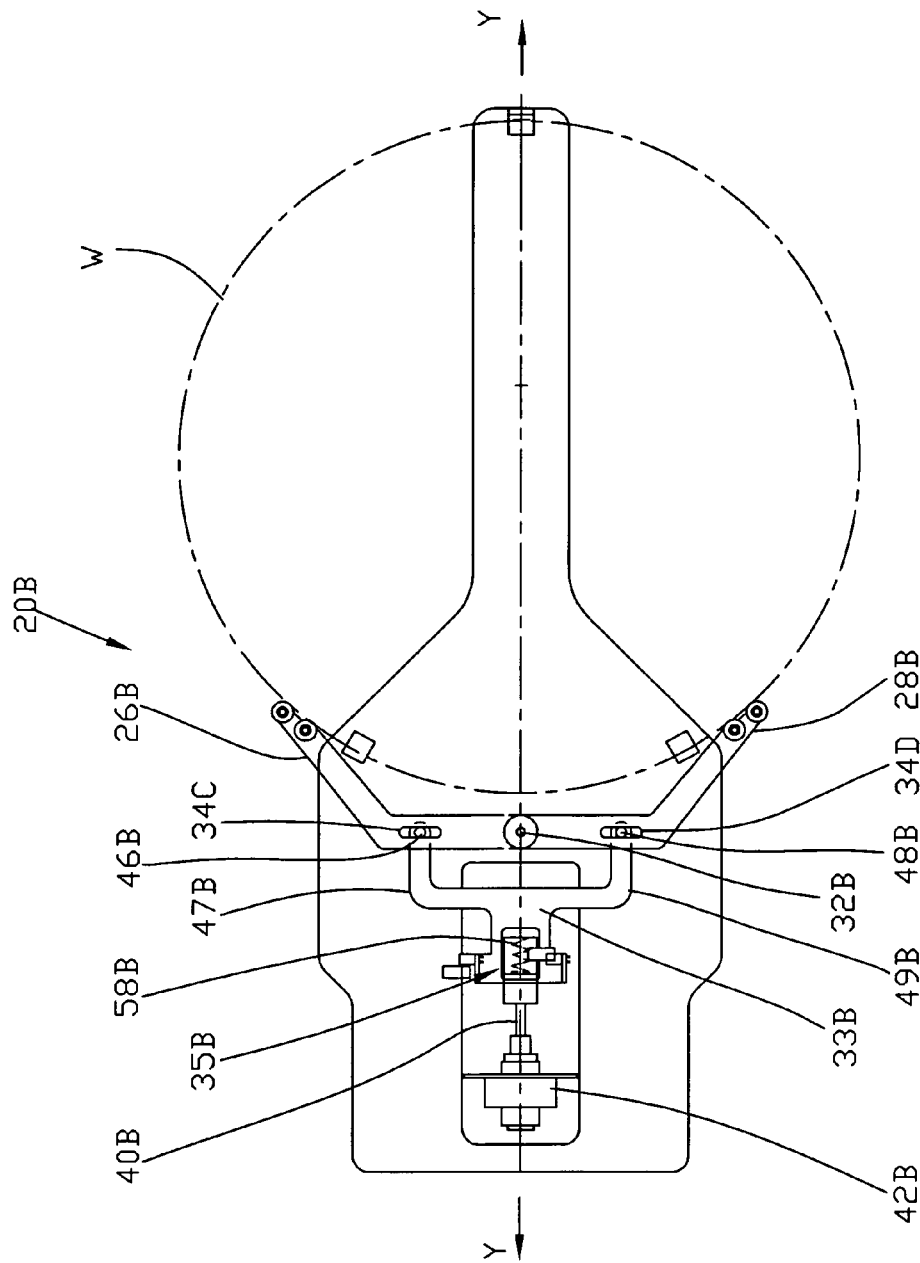
FIG. 12 is a view that illustrates another embodiment of the gripper arrangements and movements with pins, which are rigidly connected to the slide and are guided in transverse slots of the gripping arms.

FIG. 12 illustrates another embodiment of the gripper arrangements and movements. In this embodiment, where possible, the parts similar to those of the embodiment of FIG. 1 are designated by the same reference numerals with an addition of symbol "B". The mechanism of FIG. 12 differs from similar mechanisms of the embodiments of FIG. 1 and FIG. 11 in that the pins 46B and 48B, which are rigidly connected to brackets 47B and 49B, which in turn are connected to the slide 33B, are guided in transverse slots 34C and 34D formed in the L-shaped arms 26B and 28B.

Figure 13:
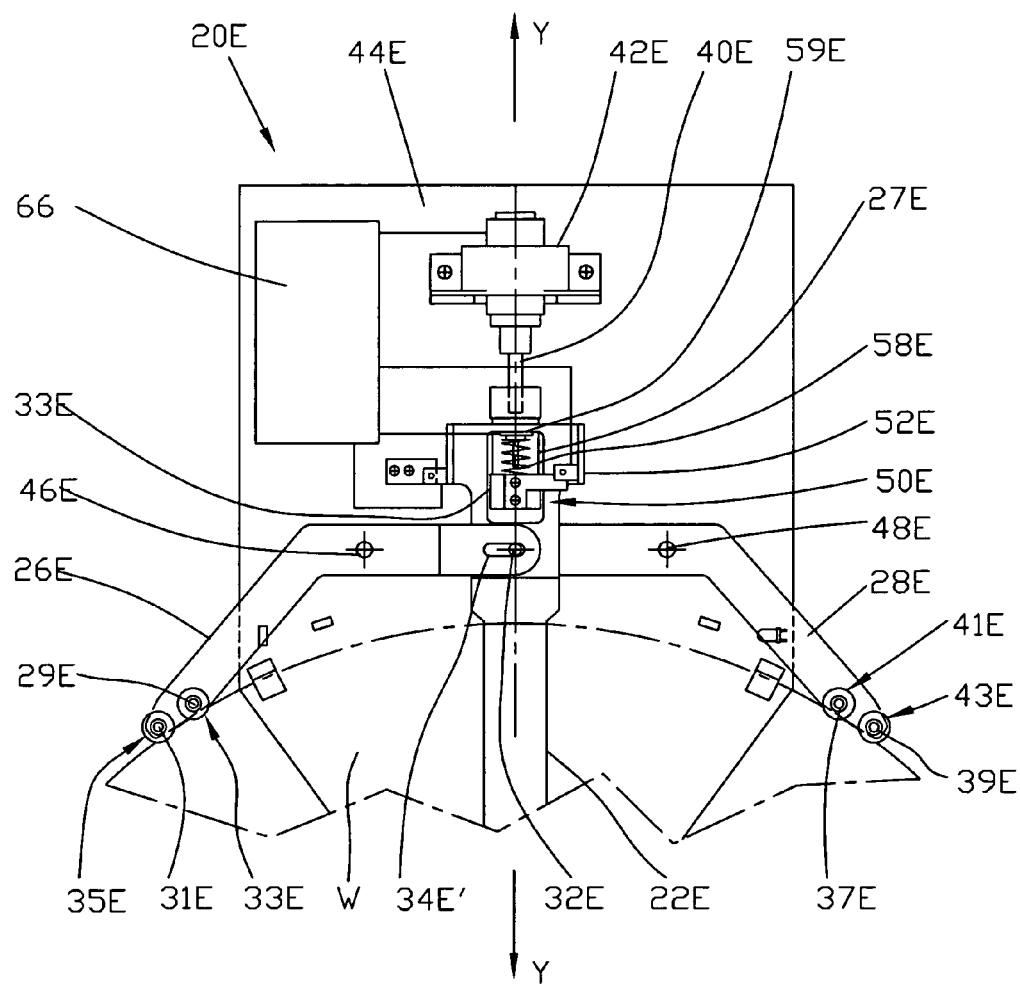
FIG. 13 is a fragmental plan view of an end effector made in accordance with an embodiment, in which the gripping force is controlled by a stop moveable with the slide and engaging a limit switch of the stepper motor drive.

FIG. 13 is a fragmental plan view of an end effector 20E made in accordance with another embodiment of the invention. In this embodiment, where possible, the parts similar to those of the previous embodiments shown in FIGS. 1–12 are designated by the same reference numerals with an addition of symbol "E". An arm 26E rigidly support axes 29E, 31E of rollers 33E and 35E, respectively, rotatingly supported by the aforementioned axes 29E, 31E. Similarly, an arm 28E rigidly supports axes 37E, 39E of rollers 41E and 43E, respectively, rotatingly supported by the aforementioned axes 37E, 39E. The other ends of the arms 26E and 28E have slots 34E' and 34E" (the slot 34E" is not shown in the drawings as it is overlapped by the arm 26E) for guiding a pin 32E rigidly attached to the first finger 22E. The arms 26E and 28E are pivotally supported by respective pivots 46E and 48E which are rigidly attached to a base plate 44E. The base plate also supports a stepper motor 42E having an actuating rod 40E arranged in the direction of the first pin 22E and connected via a main spring 58E to a slide 33E which, in turn, is guided in a longitudinal slot 27E formed on the proximal end of the first finger 22E, i.e., on the end opposite to the distal post (not shown).

The slide 33E supports a stop element 50E engageable with a limit switch 52E. The main spring 58E is calibrated so that when the posts 33E and 35E, 41E, 43E, and the distal post (not shown in FIG. 13) grip the edges of the semiconductor wafer W with a predetermined force, the stop element 50E engages the limit switch 52E and stops the stepper motor 42E and thus discontinues the gripping movements of the respective gripping posts. It has been shown above that the limit switch 52E controls compression of the main spring and thus the force of gripping of the wafer.

In order to control the speed of operation of the stepper motor 42E and thus to adjust the speed of movements of the gripping posts on different stages of the gripping cycle, the main spring 58E is provided with a pressure sensor 59E of the type CEA-125UN-120 produced by Micro-Measurement. This mechanism is needed for precision control of the pressure between the gripping posts and the edge of the wafer W. Such a system makes it possible to divide the path of the gripping posts into portions with different speed and acceleration of movement for optimization of the gripping cycle. For example, when the gripping mechanism of the end effector 20E is open, the initial movements will be performed with an increased speed, and when the gripping pressure reaches a predetermined magnitude, the speed of the posts can be gradually reduced. Furthermore, in order to increase throughput of the wafer handling procedure, it is necessary to deliver the gripped wafer to the next operation stage with a high speed. Transfer from low speeds to high speeds is accompanied by development of significant acceleration (e.g., up to 180 inch/sec$^2$) to the extent that the spring-loaded grippers can move apart and release the wafer. In order to prevent this phenomenon, it is necessary to increase the gripping force at this stage of the movement. Such an adjustment could be achieved by sending an appropriate signal from the accelerometer 51 to the microcontroller 66 (FIG. 10) which will change the gripping force via the stepper motor actuator.

Figure 14:
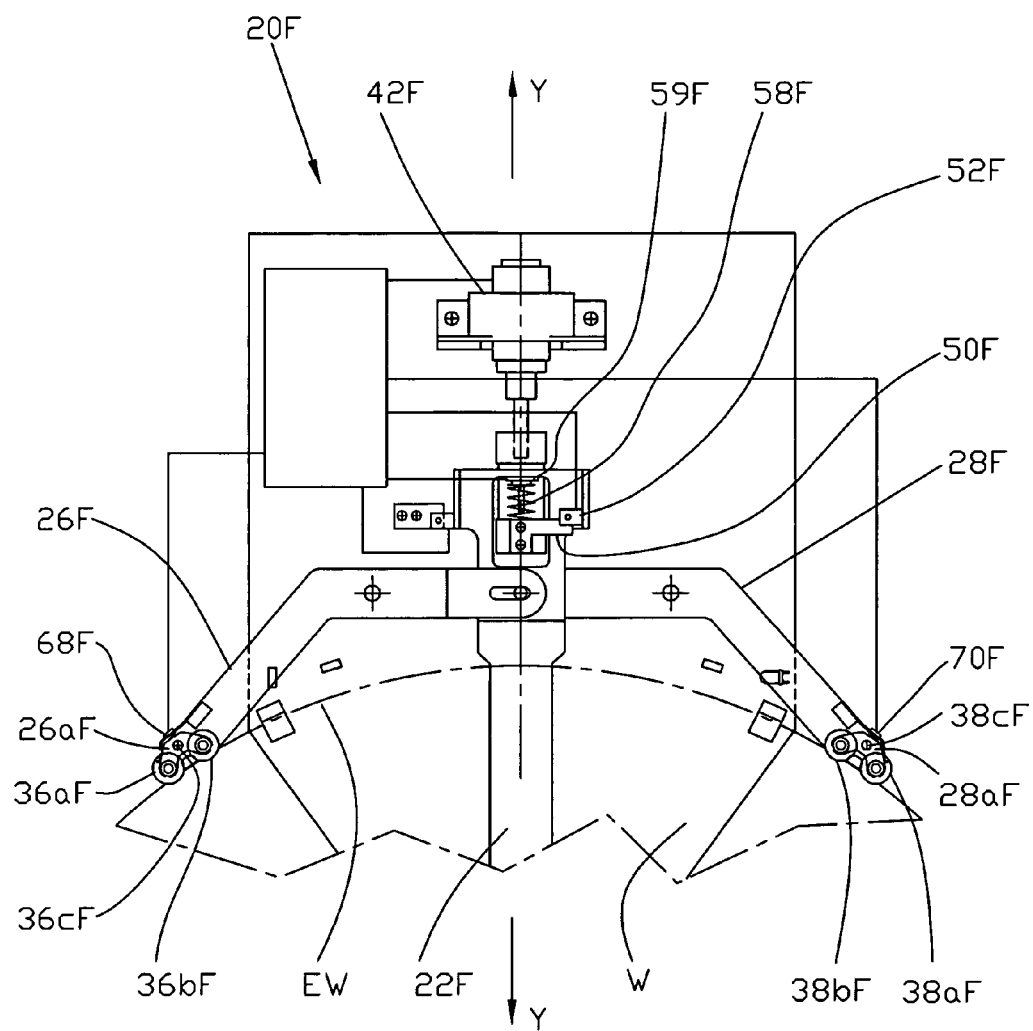
FIG. 14 is an end effector of the invention with pairs of gripping rollers installed on spring-loaded carriages pivotally attached to the ends of the gripping arms.

FIG. 14 is a view similar to FIGS. 5 and 13 and illustrates an embodiment of an end effector 20F. In the description and drawing of this embodiment, where possible, the parts identical with those of the previous embodiment will be designated by the same reference numerals with an addition of symbol "F". The device of FIG. 14 differs from the embodiments of FIGS. 5 and 13 in that the doubled gripping posts, which consists of two pairs of rollers 36aF, 36bF and 38aF, 38bF, are supported by carriages 26aF and 28aF. Each carriage is pivotally supported by respective pivots 36cF and 38cF which are rigidly attached to the ends of L-shaped arms 26F and 28F.

Extreme or outer rollers of each pair, i.e., rollers 36aF and 38aF are shifted under effect of a respective strain-gauged leaf springs 68F and 70F radially inwardly towards the center of the wafer W as compared to the remaining rollers 36bF and 38bF which are located at a slightly greater distance from the imaginary circular outer edge EW of the wafer W. As a result, when the gripping posts are moved toward the wafer during the gripping cycle, the rollers 36aF and 38aF come into contact with the edge EW first or prior to contact of the rollers 36bF and 38bF with the same edge. At the moment of contact of the rollers 36aF and 38bF with the wafer edge EW the strain gauges of the springs 68F and 70F send commands to the stepper motor 42F for immediate decrease in the speed of gripping, so that further movement of the gripping posts will continue till the moment of contact of the rollers 36bF and 38bF occurs with a reduced speed and in a smooth manner to provide a soft touch between the rollers and the wafer. The gripping process is accompanied by smooth rotation of the carriages 26aF and 28aF around their pivots 36cF and 38cF. As in the embodiment of FIG. 13, the stepper motor 42F is stopped when the gripping force reaches a predetermined value.

The remaining mechanism of the end effector 20F (FIG. 14), i.e., the pressure sensor 59F, the spring 58F, the stop element 50F and the limit switch 52F are the same in their structure and function as similar parts of the embodiment of FIG. 13.

Operation of the End Effector of the Invention

Embodiment of FIGS. 1–10

The end effector 20 of the embodiment shown in FIGS. 1–6 operates as follows: Let us assume that the mechanical arm of the robot (not shown) performs automatic transfer of semiconductor wafers W1 (FIG. 2) stored in a wafer cassette (not shown) to a wafer processing station (not shown). It is understood that prior to the transportation operation, the wafer W1 has to be reliably grasped and gripped with a predetermined force by means of the end effector 20 of the present invention.

As the robot arm moves in the Z-axis direction (FIGS. 1 and 2) to the next operational slot of the cassette (not shown), the mapping sensor 50 determines the Z-axis position of the edge of the next wafer W1 to be gripped in the cassette. According to the detected Z-axis position, the robot controller calculates the coordinate of the central line between the wafers stacked and spaced in the cassette. The robot arm then aligns the end effector 20 with a required position on the Z-axis.

Upon completion of the Z-axis alignment, the end effector 20 is moved in the Y-axis direction. The part of the end effector 20 insertable into the cassette has a width H (FIG. 9) of about 4.3 mm, whereas the pitch of a cassette slot has a width of about 10 mm (according to Semistandard), so that the end effector 20 can easily be inserted into a space between the adjacent wafers in the cassette. The robot arm moves the end effector 20 in the Y-axis direction (FIG. 1) so that the distal post 24 is moved under the wafer W1 towards the edge of this wafer opposite to the front edge which faces the posts 36a, 36b and 38a, 38b. At this stage of the operation, the fingers 22, 26, and 28 are spread apart (see FIG. 5 where only two posts are shown) to a distance that forms between the three posts a space that exceeds the diameter of the wafer.

The Y-axis movement of the end effector 20 will continue until the first through-beam sensor 56a, 56b detects the precise position of Y-axis coordinate of the front edge E1 (FIG. 4) of the wafer W1. At this moment, the through-beam wafer surface inclination sensors 52a, 52b and 54a, 54b determine the inclination of the plane of the wafer W1 with respect to the plane XY of the end effector 20. If the wafer W1 is not inclined and is ready for lifting by the robot arm and for gripping by the end-effector, beams B3 and B4 (FIG. 2) are blocked by the wafer and cannot reach the respective light-receiving elements 52b and 54b. If the wafer is inclined, one or both beams from the light transmitter can reach the respective light receiver. The latter sends a respective signal to the robot arm via the microcontroller 66 (FIG. 5) to displace the end effector until the correct position is reached and the through beams are blocked.

After the wafer is aligned with respect to the end effector 20, the latter is lifted by the robot arm to an operating gripping position, and the stepper motor 42 begins to move all three posts 37, 38, and 24 towards each other. After precise positioning, the gripper's actuating posts start moving simultaneously. During gripping operation, when all three fingers with their respective posts move radially inwardly for gripping the wafer W1 and provide self-centered movement, the spring-loaded outer rollers 36a, 38a (FIG. 5) come into contact with the edges of the wafer W first. The continuing inward radial movement of the fingers 22, 26, 28 will cause deflection of the short arms 26a and 26b with deformation of the respective leaf springs 68 and 70. Deformation of these springs will be registered by the microcontroller 66 in terms of the wafer gripping forces. The gripping force on each arm is precalibrated so that the force reaches a required value when the edge of the wafer W comes into contact with the second pair of rollers, i.e., the rollers 36c and 38c. At this moment the microcontroller 66 sends a signal to stop the stepper motor 42. When the first minimal value of the force measured by the three force sensors is achieved, the stepper motor 42 is stopped. As a result, the wafer W1 will be gripped between the three post assemblies of the end effector 20 with a predetermined soft-touch gripping force uniformly distributed over the wafer periphery between the gripping rollers 36a, 36b, 38a, 38b, and the distal post 24.

All operations described above are performed under a real-time control from the circuitry shown in FIG. 10. More specifically, all signals about positions of the wafer and the end effector, as well as about gripping forces are sent from respective sensors to the microprocessor 66, which, in turn, sends respective commands to the robot controller and to the stepper motor 42.

Now the mechanical arm of the robot can initiate the transfer operation with the wafer W gripped in the end effector.

Embodiment of FIG. 11

Since the end effector 20A of this embodiment is similar to the end effector 20 of the previous embodiment, a detailed description of its operation is omitted. It should only be noted that during the gripping cycle the actuator 40A of the stepper motor 42A (FIG. 11) moves the slide 33A in the direction opposite to arrow B, whereby the arms 26A and 28A turn around the pins 46A and 48A and move toward each other and hence move the posts 36A and 38A toward the edges E of the wafer W shown in FIG. 11 by a broken line. As the distal post 24A is rigidly connected to the base plate 44A, it remains stationary during the gripping cycle. In this case, unloading of the wafer is carried out by moving the robot arm (not shown) in the direction of arrow B. In this case, for unloading of the wafer the arms 26A and 28A should be spread apart to a sufficient distance, and the wafer will slip down to the resting position.

Embodiment of FIG. 12

Since the end effector 20B of this embodiment is similar to the end effectors 20 and 20A of the previous embodiments, a detailed description of its operation is omitted. It should only be noted that during the gripping cycle the actuating rod 40B of the stepper motor 42B (FIG. 12) moves the slide 33B via the main spring 58B in the direction of arrow C, whereby pins 46B and 48B slide in transverse slots 34C and 34D formed in the L-shaped arms 26B and 28B. As the pins 46*b* and 48*b* are rigidly connected to brackets 47B and 49B which in turn are connected to the slide 33B, operation of the stepper motor causes rotation of the arms 26B and 28B around the pin 32B, whereby the gripping posts move toward each other to perform the gripping action.

Embodiment of FIG. 13

Since the end effector 20E of this embodiment is similar to the end effectors of the previous embodiments, a detailed description of its operation is omitted. When the stepper motor 42E is activated, its actuating rod 40E moves the slide 33E via the main spring 58E. When the gripping posts or rollers come into contact with the wafer W with a predetermined force, the stop element 50E attached to the slide 33E engages a limit switch 52E that stops the stepper motor 42E. At the same time, the aforementioned pressure sensor 59E optimizes the gripping cycle by increasing the gripping speed at the initial stage when the rollers are beyond the contact with the wafer and by reducing the gripping speed and acceleration after the rollers touch edge of the wafer. Adjustment of the gripping speed and acceleration are important also in connection with changes in the gripping system rigidity, which occurs when the gripping rollers perform rapid movement with high acceleration, or when additional forces suddenly occur at the moment of contact between the wafer edge and the second pair of rollers(flip-over procedures).

Embodiment of FIG. 14

Since the end effector 20F of this embodiment is similar to the end effectors of the previous embodiments, a detailed description of its operation is omitted. The device of FIG. 14 differs from the embodiments of FIGS. 5 and 13 in that when the stepper motor 42F begin to operate for initiation of the gripping motion, extreme or outer rollers of each pair, i.e., rollers 36*a*F and 38*a*F, are shifted under effect of a respective strain-gauged leaf springs 68F and 70F radially inwardly towards the center of the wafer W, the rollers 36*a*F and 38*a*F come into contact with the edge EW first, i.e., prior to contact of the rollers 36*b*F and 38*b*F with the same edge. At the moment of contact of the rollers 36*a*F and 38*b*F with the wafer edge EW the strain gauges of the springs 68F and 70F send commands to the stepper motor 42F for immediate decrease in the speed of gripping, so that further movement of the gripping posts till the moment of contact of the rollers 36*b*F and 38*b*F occurs with a reduced speed and in a smooth manner to provide a soft touch between the rollers and the wafer. The gripping process is accompanied by smooth rotation of the carriages 26*a*F and 28*a*F around their pivots 36*c*F and 38*c*F. As in the embodiment of FIG. 13, the stepper motor 42F is stopped when the gripping force reaches a predetermined value. The end effector of this embodiment can decrease the gripping force when the gripping posts come into contact with the wafer edge with acceleration. This will compensate for an increase in rigidity of the system.

Operations of the remaining mechanism of the end effector 20F (FIG. 14), i.e., of the pressure sensor 59F, the main spring 58F, the stop element 50F and the limit switch 52F are the same in their structure and function as similar parts of the embodiment of FIG. 13.

Thus it has been shown that the invention provides an end effector for handling flat thin objects, such as semiconductor wafers, with a predetermined soft-touch gripping force. The end effector operates with high reliability. It has at least three edge gripping posts moving simultaneously in the same direction and stopped when a predetermined gripping force is achieved. The end effector is equipped with a precision gripping force measurement mechanism and is provided with means for adjusting the speed and acceleration of gripping on different stages of the gripping cycle. The end effector provides decrease in gripping force to compensate for an increase in rigidity of the system when the gripping posts come into contact with the wafer edge with acceleration.

The end effector has sensors for determining position of the gripping posts in a plane of the wafer and sensors for determining deviation of the gripping posts from the wafer plane. One of the sensors for controlling position in the plane of the wafer is a mapping sensor for checking that the place of destination of the wafer is free for loading-unloading.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, force sensors of other types can be used for measuring gripping forces. The L-shaped gripping fingers may be replaced by rectangular, triangular plates or may have any other configuration. One or more than two rollers can be attached to the gripping fingers. The gripping arms on the proximal side of the gripper can be spread apart at different angular distances from each other. With certain rearrangements one gripping post can be located on the proximal side and two gripping posts can be located on the distal side, i.e., on the side opposite to the motor. The gripping rollers may have different profiles. The gripping posts may be made in the forms other than rollers.

A precision rotary drive with a worm-gear reducer or a piezo-actuator can be used instead of the stepper motor.

What is claimed is:

1. A precision soft-touch gripping mechanism for flat objects, said precision soft-touch gripping mechanism having a longitudinal axis and an actuating member, each of said flat objects having a plane and a peripheral edge, said precision soft-touch gripping mechanism comprising:
    a mounting plate;
    a linear precision drive mechanism supported by said mounting plate;
    at least three gripping posts with at least two of them moveable simultaneously radially inwardly/outwardly with respect to said peripheral edge when each of said flat objects is placed into said precision soft-touch gripping mechanism, said at least three gripping posts having a plane;
    a gripping force control means for controlling the gripping force with which said gripping posts grip said peripheral edge by controlling operation of said linear precision drive mechanism;
    said at least three gripping posts comprising:
        a first gripping post which is located on said longitudinal axis and has at least one gripping element for engaging said peripheral edge, said longitudinal axis passing through said precision drive mechanism;
        a second gripping post and a third gripping post which are located on opposite sides of said longitudinal axis;
        a first linking member that supports said first gripping post and is stationary, said precision soft-touch gripping mechanism further comprising a first pivot rigidly connected to said mounting plate on one side relative to said longitudinal axis, and a second pivot rigidly connected to said plate on the side relative to said longitudinal axis opposite to said one side;
        a second linking member that is pivotally supported by said first pivot; and
        a third linking member that is pivotally supported by said second pivot, said gripping force control means having a sliding member connected to said linear precision drive mechanism and moveable in the direction of said longitudinal axis, said sliding member having a first pin rigidly connected thereto, said second linking member and said third linking member have respective slots in the direction transverse to said longitudinal axis, said respective slots being at least partially overlapped, said first pin being slidingly guided in said respective slots.

2. The precision soft-touch gripping mechanism of claim 1, wherein said gripping force control means further comprises a main spring located between said actuating member and said sliding member, and means for controlling compression of said main spring in terms of said gripping force.

3. The precision soft-touch gripping mechanism of claim 2, wherein said main spring is a coil spring, said means for controlling compression of said main spring is a pressure sensor connected to said stepper motor for stopping operation of said stepper motor when said coil spring is compressed with a predetermined force.

4. The precision soft-touch gripping mechanism of claim 2, wherein said springing is a coil spring, said means for controlling compression of said spring is a limit switch connected to said linear precision drive mechanism for stopping operation of said linear precision drive mechanism when said coil spring is compressed with a predetermined force.

5. The precision soft-touch gripping mechanism of claim 1, further comprising sensor means for determining position of said plane of said at least three gripping posts end effector substantially with respect to said plane of said flat object and sensor means for determining that said plane of said at least three gripping posts deviates from said plane of said flat object.

6. The precision soft-touch gripping mechanism of claim 5, wherein said sensor means for determining position of said at least three gripping posts substantially with respect to said plane of said flat object comprises at least one mapping sensor for determining that the position of destination of said flat object is free for unloading said flat object and at least one through-beam sensor for determining position of said edge of said flat object.

7. The precision soft-touch gripping mechanism of claim 5, wherein said flat object is circular and has a center, said sensor means for determining that said plane of said at least three gripping posts deviates from said plane of said flat object comprises a pair of sensors, each of said sensors comprising a light transmitter that emits a light beam and a light receiver that receives said light beam, said light emitter and light receiver being located on opposite sides relative to said longitudinal axis, the light beams of each of said sensors intersecting in the center of said circular flat object.

* * * * *